United States Patent
Wei et al.

(10) Patent No.: US 10,911,919 B2
(45) Date of Patent: Feb. 2, 2021

(54) WIRELESS ACCESS METHOD, WIRELESS RECEIVING METHOD FOR A COMMUNICATION SYSTEM AND A BASE STATION THEREFOR WITH A LOW-LATENCY MECHANISM

(71) Applicant: INDUSTRIAL TECHNOLOGY RESEARCH INSTITUTE, Hsinchu (TW)

(72) Inventors: Hung-Fu Wei, Hsinchu (TW); Jing-Shiun Lin, Taichung (TW); Chiu-Ping Wu, Zhubei (TW); Jen-Yuan Hsu, Jincheng Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 51 days.

(21) Appl. No.: 16/231,704

(22) Filed: Dec. 24, 2018

(65) Prior Publication Data
US 2020/0204970 A1 Jun. 25, 2020

(51) Int. Cl.
*H04W 4/00* (2018.01)
*H04W 4/70* (2018.01)
*H04W 74/08* (2009.01)
*H04W 74/00* (2009.01)

(52) U.S. Cl.
CPC ........ *H04W 4/70* (2018.02); *H04W 74/006* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 9,844,072 B2 | 12/2017 | Chen et al. | |
| 2011/0188467 A1* | 8/2011 | Kawamura | H04L 5/0041 370/330 |
| 2011/0249659 A1* | 10/2011 | Fontaine | H04L 1/20 370/338 |
| 2016/0088652 A1 | 3/2016 | Patel et al. | |

(Continued)

FOREIGN PATENT DOCUMENTS

| | | |
|---|---|---|
| GB | 2529029 A | 2/2016 |
| TW | 201607355 A | 2/2016 |
| TW | I662822 B | 6/2019 |

OTHER PUBLICATIONS

Chih-Lin, "Seven Fundamental Rethinking for Next-generation Wireless Communications," SIP, vol. 6, e10, 2017, pp. 1-16.
Ford et al., "Achieving Ultra-Low Latency in 5G Millimeter Wave Cellular Networks," IEEE Communications Magazine, Mar. 2017, pp. 196-203.

(Continued)

*Primary Examiner* — Elisabeth Benoit Magloire
(74) *Attorney, Agent, or Firm* — Birch, Stewart, Kolasch & Birch, LLP

(57) ABSTRACT

A wireless access method for a communication system is provided. The wireless access method is adapted to a base station, and includes the following steps. A first control information is transmitted through a first frequency band. A second control information is transmitted through a second frequency band. The time difference between the transmission time points of the first control information and the second control information is less than a slot time, and the first frequency band is different from the second frequency band.

34 Claims, 9 Drawing Sheets

(56) References Cited

U.S. PATENT DOCUMENTS

| | | | |
|---|---|---|---|
| 2016/0143008 A1 | 5/2016 | Lee et al. | |
| 2017/0265169 A1 | 9/2017 | Chen et al. | |
| 2017/0318564 A1 | 11/2017 | Lee et al. | |
| 2017/0374652 A1* | 12/2017 | Islam | H04W 72/042 |
| 2018/0063865 A1 | 3/2018 | Islam et al. | |
| 2018/0083758 A1 | 3/2018 | Islam et al. | |
| 2018/0132237 A1 | 5/2018 | Sundararajan et al. | |
| 2018/0133477 A1* | 5/2018 | Backus | A61N 1/0541 |
| 2018/0278373 A1* | 9/2018 | Wang | H04L 1/1812 |
| 2019/0036559 A1* | 1/2019 | Wu | H04L 25/0212 |
| 2020/0037199 A1* | 1/2020 | Wang | H04W 72/1242 |
| 2020/0059904 A1* | 2/2020 | Takeda | H04W 72/042 |
| 2020/0068537 A1* | 2/2020 | Oh | H04W 72/04 |
| 2020/0084787 A1* | 3/2020 | Hao | H04B 7/0456 |

OTHER PUBLICATIONS

Levanen et al., "Radio Interface Design for Ultra-Low Latency Millimeter-Wave Communications in 5O Era," Globecom 2014 Workshop—Ultra-Low Latency and Ultra-High Reliability in Wireless Communications, 2014, pp. 1420-1426.

Luvisotto et al., "Ultra High Performance Wireless Control for Critical Applications: Challenges and Directions," IEEE Transactions on Industrial Informatics, vol. 13, No. 3, Jun. 1, 2017, pp. 1448-1459.

Schulz et al., "Latency Critical IoT Applications in 5G: Perspective on the Design of Radio Interface and Network Architecture," IEEE Communications Magazine, Feb. 2017, pp. 70-78.

Wirth et al., "5G New Radio and Ultra Low Latency Applications: a PHY Implementation Perspective," Asilomar, 2016, pp. 1409-1413.

\* cited by examiner

| Numerology | Slot duration | Mini-slot duration (4 symbols) | OFDM symbol time |
|---|---|---|---|
| 240kHz | 62.43us | 17.84us | 4.46us |
| 120kHz | 125us | 35.72us | 8.93us |
| 60kHz | 250us | 71.35us | 17.84us |
| 30kHz | 500us | 142.72us | 35.68us |
| 15kHz | 1ms | 285.44us | 71.36us |

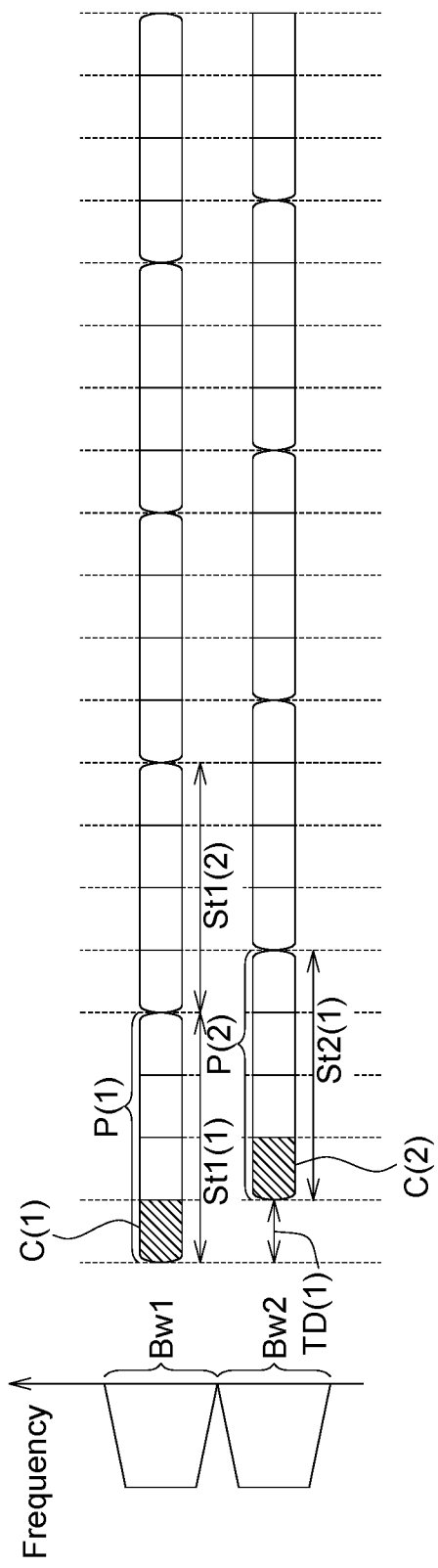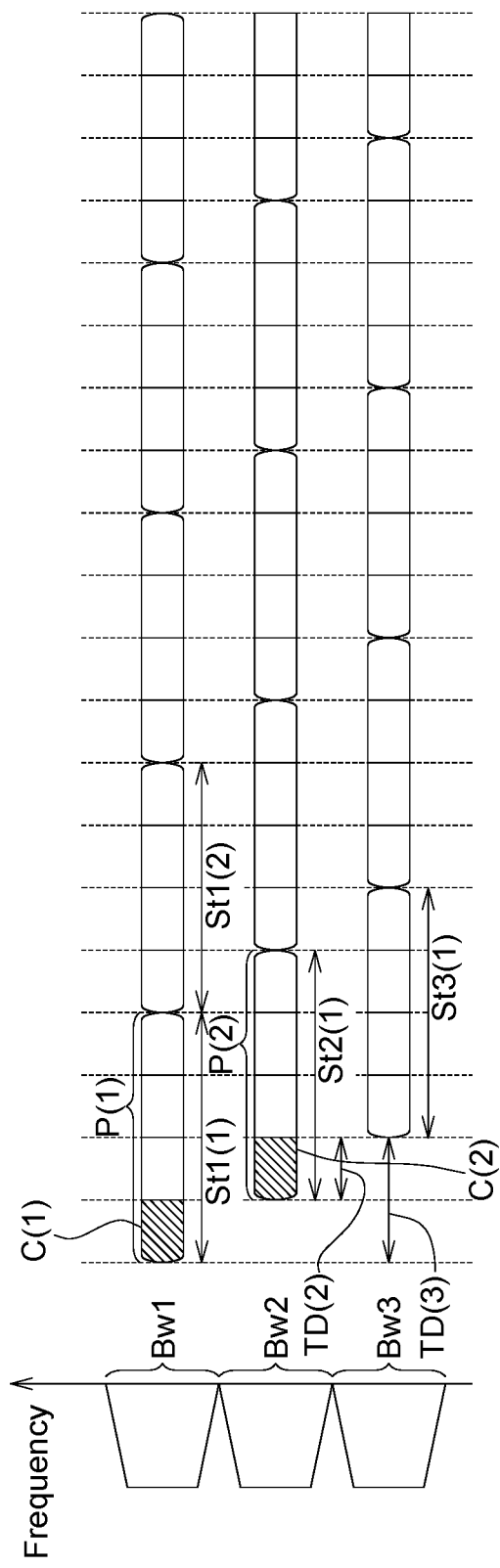

WIRELESS ACCESS METHOD, WIRELESS RECEIVING METHOD FOR A COMMUNICATION SYSTEM AND A BASE STATION THEREFOR WITH A LOW-LATENCY MECHANISM

TECHNICAL FIELD

The disclosure relates to a wireless access method and a wireless receiving method for a communication system, and a base station using the same.

BACKGROUND

In response to the current application of Internet of things (IoT) and smart city, in recent years, mobile communication is also used in the communication between things in addition to the communication between people. The 5-th generation (5G) communication technology of mobile communication system mainly has three features: enhanced mobile broadband (eMBB), massive machine type communication (mMTC), and ultra-reliable and low-latency communications (URLLC). The URLLC is mainly used in application fields requiring low latency and high reliability, such as self-driving car, industrial process automation, remote medical surgery, and tactile Internet.

Latency can be reduced by shortening the slot duration to reduce the overall transmission time under the same frame structure. In comparison to the 15 KHz sub-carrier spacing of the long-term evolution (LTE) technology, the technology of the next generation considers to adopt a larger sub-carrier spacing to shorten the slot duration. Larger sub-carrier spacing allows the slot interval to be reduced, and therefore achieves a lower latency. However, when sub-carrier spacing is larger, multi-path fading will become worse. Therefore, interference between symbols will occur and this deteriorates system efficiency. Moreover, as the sub-carrier spacing increases, the minimum frequency band will increase, and the hardware complexity of the transceiver will increase. Consequently, the hardware cost of the transceiver will increase.

Therefore, it has become a prominent task for the industries to meet the low latency requirement of the 5G standards with suitable control of system complexity.

SUMMARY

According to one embodiment, a wireless access method for a communication system is provided. The wireless access method includes the following steps. A first control information is transmitted by a transmitter through a first frequency band. A second control information is transmitted by the transmitter through a second frequency band. The time difference between the transmission time points of the first control information and the second control information is less than a slot time, and the first frequency band is different from the second frequency band.

According to another embodiment, a wireless receiving method for a communication system is provided. The method includes the following steps. A first control information and a second control information are sequentially monitored by a receiver to determine whether the first control information and the second control information are for the receiver. If yes, data decoding is performed by the receiver to receive a corresponding control information. The first control information is transmitted through the first frequency band, and the second control information is transmitted through the second frequency band. The time difference between the transmission time points of the first control information and the second control information is less than a slot time, and the first frequency band is different from the second frequency band.

According to an alternative embodiment, a base station is provided. The base station includes a transmission schedule selection module and a transmitter module. The transmitter module is electrically connected to the transmission schedule selection module, and, under the control of the transmission schedule selection module, transmits a first control information and a second control information through a first frequency band and a second frequency band respectively. The time difference between the transmission time points of the first control information and the second control information is less than a slot time, and the first frequency band is different from the second frequency band.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 5 is a schematic diagram of an example of implementing the wireless access method for a communication system of FIG. 4.

FIG. 6 is a schematic diagram of another example of implementing the wireless access method for a communication system of FIG. 4.

DETAILED DESCRIPTION

Low-latency system is one of the focuses in the development of the 5G system. The specifications of the low-latency system allow the total time from transmission to reception to be less than 1 ms, such that the communication connection time can be reduced. This is because the wireless access time will be even shorter in many of future applications. For example, the wireless access time required by the mission-critical machine type communications (MTC) applications, such as remote surgery, tactile network, and industrial process automation, is less than 100 μs.

Figure 1:
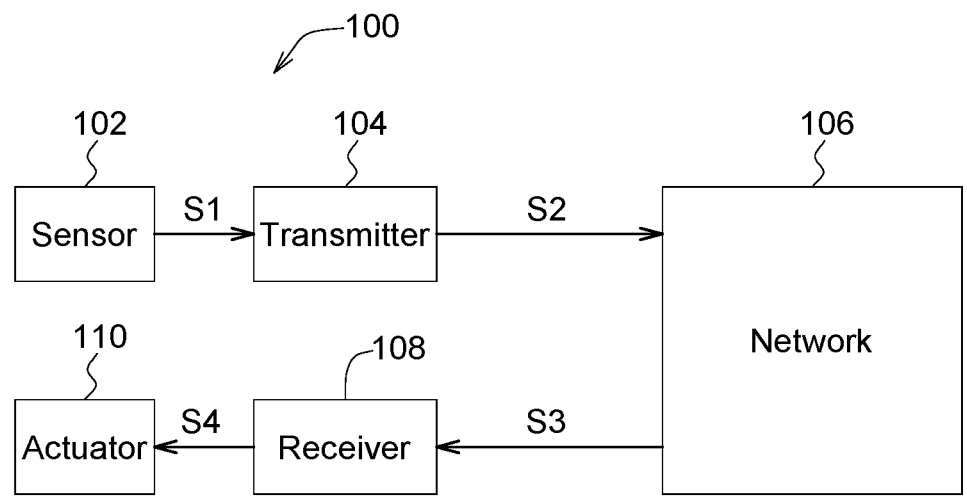
FIG. 1 is a schematic diagram of an example of a mission-critical machine type communications (MTC) system.

Referring to FIG. 1, a schematic diagram of an example of an MTC system is shown. Assume that the MTC system 100 includes a sensor 102, a transmitter 104, a receiver 108, and an actuator 110. The system 100 communicates with the network 106. After the sensor 102 senses a signal, the sensor 102 generates a signal S1, and transmits a corresponding wireless signal S2 to the network 106 through the transmitter 104. After the network 106 finishes the processing of relevant procedures, the network 106 transmits a wireless signal S3 back to the receiver 108, which accordingly generates a corresponding signal S4 to the actuator 110. The time period from the time point at which the sensor 102 outputs the signal S1 to the time point at which the transmitter outputs the signal S2 is T1. The time period for the wireless signal S2 to be transmitted to the network 106 is T2. The time required by the network 106 for performing corresponding processing is T3. The time period for the wireless signal S3 to be transmitted to the receiver 108 from the network 106 is T4. The time period from the time point at which the receiver 108 receives the signal S3 to the time point at which the signal S4 is outputted to the actuator 110 is T5. For the total time of transmission and reception (that is, T1+T2+T3+T4+T5) to be less than 1 ms, T2 and T4 respectively need to be less than 100 μs (assume T3 is about 500 μs, T1+T5 is about 300 μs). How to make T2 and T4 respectively be less than 100 μs, such that the wireless signal receiving device (such as the actuator 110) can have sufficient time to perform relevant processing (for example, to process the information transmitted from the sensor 102) is one of the objects of the present embodiment.

Figure 2:
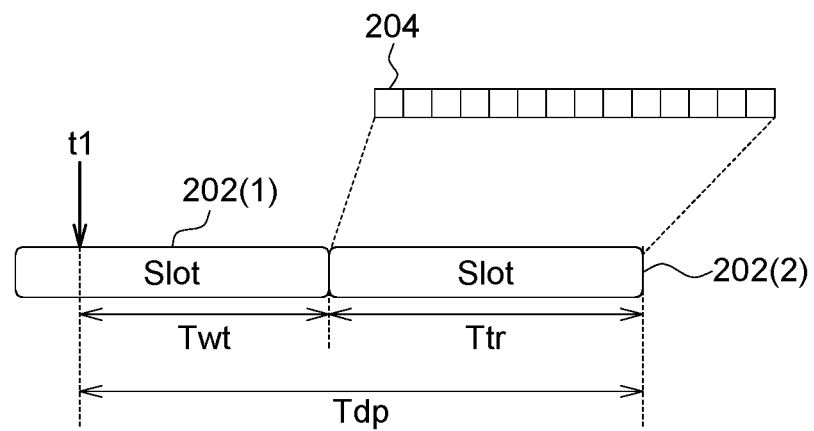
FIG. 2 is a schematic diagram of latency during frame transmission.

In the slot-based transmission method, frame transmission time and waiting time are two critical factors that affect latency at the base frequency end. Referring to FIG. 2, a schematic diagram of latency during frame transmission is shown. Assume each slot 202, such as slot 202(1) and 202(2), includes 14 orthogonal frequency-division multiplexing (OFDM) symbols 204. If the data is ready for transmission at time point t1 which is not the start point of the slot 202(1), the data must wait for a waiting time Twt and cannot be transmitted until the start point of the next slot 202(2) is reached. The time required for transmission is referred as transmission time Ttr. Thus, latency Tdp is equivalent to the sum of the waiting time Twt and the transmission time Ttr.

Figures 3, 4:
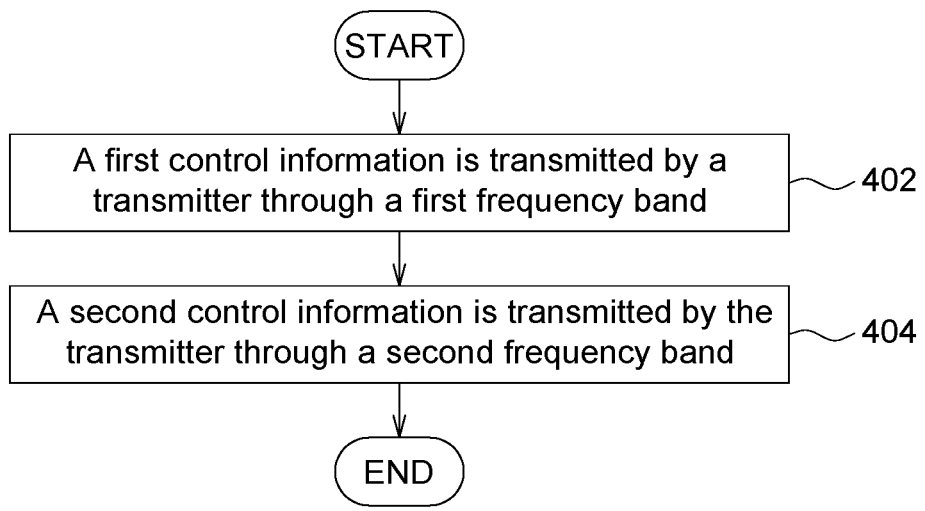
FIG. 3 is a table of slot duration, mini-slot duration and OFDM symbol time corresponding to different numerology.
FIG. 4 is a flowchart of a wireless access method for a communication system according to an embodiment of the present disclosure.

Referring to FIG. 3, a table of slot duration, mini-slot duration and OFDM symbol time corresponding to different numerology is shown. The numerology represents sub-carrier spacing (SCS). When the SCS is equivalent to 240 kHz, each OFDM symbol time is 4.46 μs. Since each slot includes 14 OFDM symbols in total, the slot duration is equivalent to 62.43 μs (that is, 4.46 μs*14=62.43 μs), and the largest waiting time Twt is a slot duration, that is, 62.43 μs. The largest latency Tdp is equivalent to the sum of the largest waiting time Twt plus the transmission time Ttr, and can be obtained from the equation: 62.43 μs+62.43 μs=124.86 μs. Therefore, when the SCS is equivalent to 240 kHz, the slot having 14 OFDM symbols still cannot meet the requirement of having a latency less than 100 μs.

If the SCS is equivalent to 60 kHz and mini-slots are used, each OFDM symbol time is 17.84 μs. Since each mini-slot includes 4 OFDM symbols in total, a mini-slot duration is equivalent to 71.35 μs (=17.84 μs*4), and the largest waiting time Twt is a mini-slot duration, that is, 71.35 μs. However, the largest latency Tdp, which is equivalent to the sum of the largest waiting time Twt plus the transmission time Ttr, can be obtained from the equation: 71.35 μs+71.35 μs=142.7 μs. Therefore, when the SCS is equivalent to 60 kHz, the use of mini-slots each including 4 OFDM symbols still cannot meet the requirement of having a latency less than 100 μs.

Although the waiting time Twt and the frame transmission time Ttr can be reduced by adjusting the numerology and using a larger sub-carrier spacing to shorten the slot duration, such method still has the following disadvantages: (1) The occupied frequency band increase, and it is very difficult to find a large frequency band for use in some frequency bands particularly under sub-6 GHz (such as the SCS is less than 60 kHz). (2) Since the millimeter wave radio frequency technology is hard to be implemented and the circuit design has high level of difficulty, the cost of transceivers increases. (3) Larger numerology is susceptible to the influence of multi-path fading in wireless communication, which deteriorates the quality of wireless communication. Therefore, how to avoid the above disadvantages and achieve the requirement of having a latency less than 100 μs is one of the problems that the present disclosure aims to resolve.

To resolve the above problems, the present disclosure provides a wireless access method for a communication system. Referring to FIG. 4, a flowchart of a wireless access method for a communication system according to an embodiment of the present disclosure is shown. The wireless access method for a communication system according to an embodiment of the present disclosure is adapted to a base station. The wireless access method includes the following steps. In step 402, a first control information is transmitted through a first frequency band. In step 404, a second control information is transmitted through a second frequency band. The time difference between the transmission time points of the first control information and the second control information is less than a slot time, and the first frequency band is different from the second frequency band.

According to the above methods of the present disclosure, the first control information and the second control information are transmitted through the first frequency band and the second frequency band respectively, and the time difference between the transmission time points of the first control information and the second control information is less than a slot time, such that the latency between two adjacent control information is less than a slot time. Thus, the waiting time can be effectively reduced.

Referring to FIG. 5, a schematic diagram of an example of implementing the wireless access method for a communication system of FIG. 4 is shown. In step 402, a first control information C(1) is transmitted by a transmitter through a first frequency band Bw1. In step 404, a second control information C(2) is transmitted by the transmitter through a second frequency band Bw2. The time difference TD(1) between the transmission time points of the first control information C(1) and the second control information C(2) is less than a slot time (such as the slot time St1(1) of the first frequency band Bw1 or the slot time St2(1) of the second frequency band Bw2), and the first frequency band Bw1 is different from the second frequency band Bw2.

The step 402 of transmitting the first control information C(1) through the first frequency band Bw1 may further include the step of generating a first packet P(1) and the step of selecting an unoccupied first frequency band slot St1(1) whose start time is closer to transmit the first packet P(1) through the first unoccupied frequency band slot St1(1)

according to the start time of the unoccupied first frequency band slot St1(1) of the first frequency band Bw1 and the start time of an unoccupied second frequency band slot St2(1) of the second frequency band Bw2. The first packet P(1) includes the first control information C(1).

The step 404 of transmitting the second control information C(2) through the second frequency band Bw1 may further include the step of generating a second packet P(2) and the step of selecting an unoccupied second frequency band slot St2(1) whose start time is closer to transmit the second packet P(2) through the unoccupied second frequency band slot St2(1) according to the start time of another unoccupied first frequency band slot St1(2) of the first frequency band Bw(1) and the start time of the unoccupied second frequency band slot St2(1) of the second frequency band Bw2. The second packet P(2) includes the second control information C(2).

Referring to FIG. 6, a schematic diagram of another example of implementing the wireless access method for a communication system of FIG. 4 is shown. The step 402 of FIG. 4 of transmitting the first control information C(1) through the first frequency band Bw1 may further include the step of generating the first packet P(1) and the step of selecting an unoccupied first frequency band slot St1(1) whose start time is closer to transmit the first packet P(1) through the unoccupied first frequency band slot St1(1) according to the start time of the unoccupied first frequency band slot St1(1) of the first frequency band Bw1, the start time of the unoccupied second frequency band slot St2(1) of the second frequency band Bw2, and the start time of the unoccupied third frequency band slot St3(1) of the third frequency band Bw3. The time difference TD(3) between the start time of the third frequency band slot St3(1) and the start time of the first frequency band slot St1(1) is less than a slot time, and the time difference TD(2) between the start time of the third frequency band slot St3(1) and the start time of the second frequency band slot St2(1) is less than a slot time. The first packet P(1) includes the first control information C(1), and the third frequency band Bw3 is different from the first frequency band Bw1 and the second frequency band Bw2. The slot time mentioned above is the slot time of, for example, the first frequency band slot St1(1), the second frequency band slot St2(1), or the third frequency band slot St3(1). In some embodiments, the slot time of the first frequency band slot St1(1), the second frequency band slot St2(1), or the third frequency band slot St3(1) is substantially identical to each other.

The step 404 of transmitting the second control information C(2) through the second frequency band Bw2 may include the step of generating the second packet P(2) and the step of selecting the unoccupied second frequency band slot St2(1) whose start time is closer to transmit the second packet P(2) through the unoccupied second frequency band slot St2(1) according to the start time of another unoccupied first frequency band slot St1(2) of the first frequency band Bw1, the start time of the unoccupied second frequency band slot St2(1) of the second frequency band Bw2, and the start time of the unoccupied third frequency band slot St3(1) of the third frequency band Bw3. The second packet P(2) includes the second control information C(2).

An alternate example of implementing the wireless access method for a communication system of FIG. 4 is further disclosed below. Refer to FIG. 6. The wireless access method of FIG. 4 further includes the step of obtaining the first packet P(1) including the first control information C(1) and the second packet P(2) including the second control information C(2). A priority of the first packet P(1) is higher than a priority of the second packet P(2). The step 402 of transmitting the first control information C(1) through the first frequency band Bw1 further includes the step of selecting an unoccupied first frequency band slot St1(1) whose start time is closer to transmit the first packet P(1) through the unoccupied first frequency band slot St1(1) according to the start time of the unoccupied first frequency band slot St1(1) of the first frequency band Bw1 and the start time of the unoccupied second frequency band slot St2(1) of the second frequency band Bw2. The step 404 of transmitting the second control information C(2) through the second frequency band Bw2 further includes the step of selecting the unoccupied second frequency band slot St2(1) whose start time is closer to transmit the second packet P(2) through the unoccupied second frequency band slot St2(1) according to the start time of another unoccupied first frequency band slot St1(2) of the first frequency band Bw1 and the start time of the unoccupied second frequency band slot St2(1) of the second frequency band Bw2.

The wireless access method of FIG. 4 further includes the step of sequentially monitoring the first control information C(1) and the second control information C(2) by a receiver to determine whether the packets transmitted through the first frequency band Bw1 and the second frequency band Bw2 is for the receiver. If the packet transmitted through the first frequency band Bw1 and the second frequency band Bw2 is for the receiver, the receiver performs data decoding to receive a corresponding packet.

Figure 7A:
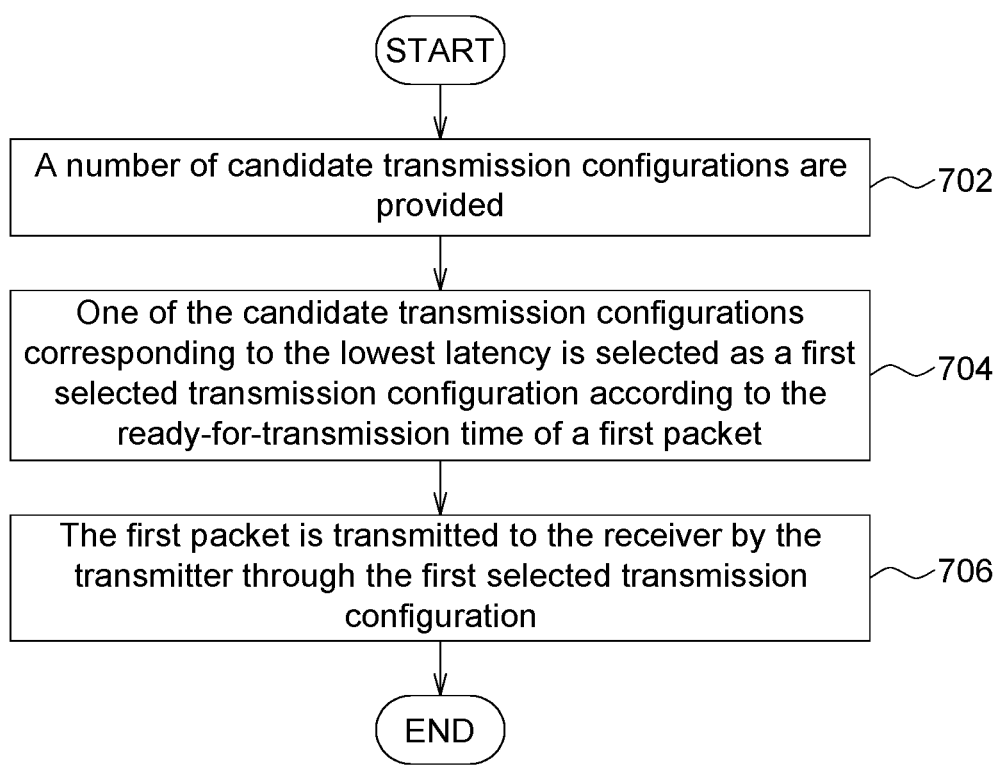
FIG. 7A is a flowchart of an alternate example of implementing the wireless access method for a communication system of FIG. 4.
Figure 7B:
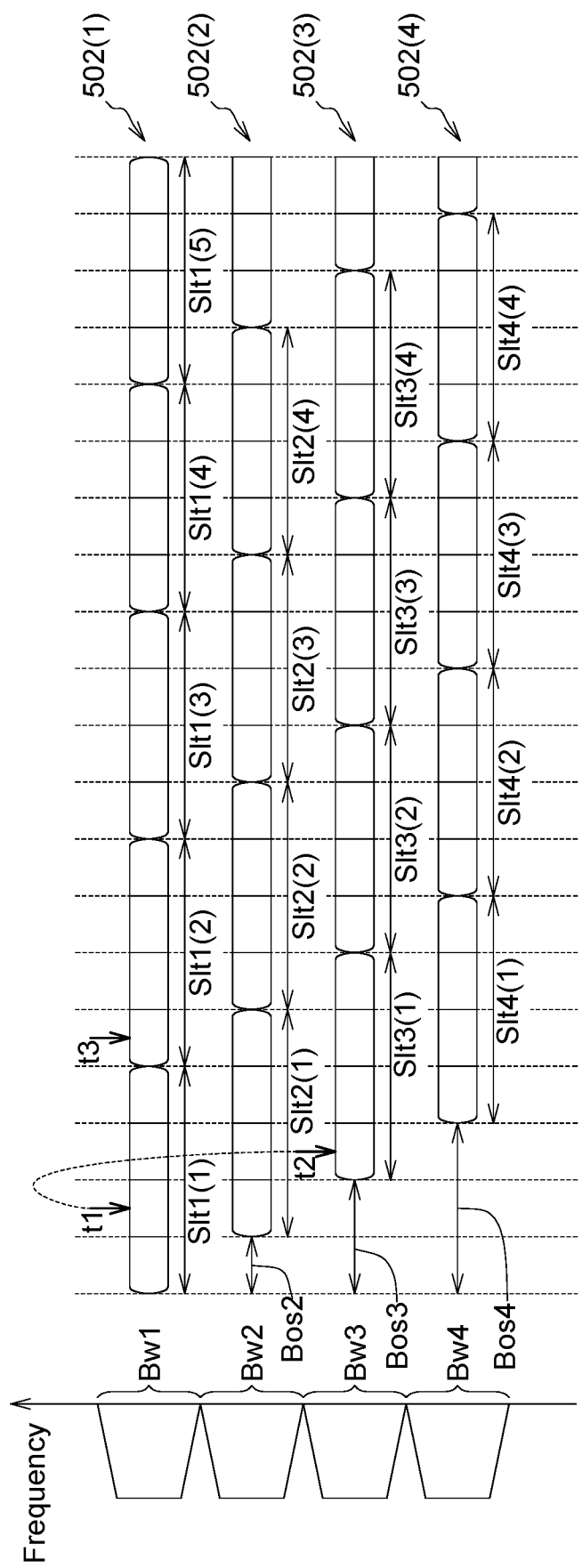
FIG. 7B is a schematic diagram of an alternate example of implementing the wireless access method for a communication system of FIG. 4.

Refer to FIG. 7A and FIG. 7B. FIG. 7A is a flowchart of an alternate example of implementing the wireless access method for a communication system of FIG. 4. FIG. 7B is a schematic diagram of an alternate example of implementing the wireless access method for a communication system of FIG. 4. The method further includes the following steps. Firstly, the method begins in step 702, a number of candidate transmission configurations each including a frequency band, a slot boundary offsets, and a number of slots are provided. The frequency bands of the candidate transmission configurations are different, and the slot boundary offsets of the candidate transmission configurations are also different, and the slot boundary offset of each candidate transmission configuration is less than the slot time. Then, the method proceeds to step 704, one of the candidate transmission configurations corresponding to the lowest latency is selected as a first selected transmission configuration according to the ready-for-transmission time of a first packet, wherein the frequency band of the first selected transmission configuration is the first frequency band, and the first packet includes the first control information. Then, the method proceeds to step 706, the first packet is transmitted to the receiver by the transmitter through the first selected transmission configuration.

In step 702, it is assumed that the communication system provides 4 candidate transmission configurations, such as candidate transmission configurations 502(1)~502(4), wherein the candidate transmission configuration 502(1) includes a frequency band Bw1 and a slot boundary offset Bos1; the candidate transmission configuration 502(2) includes a frequency band Bw2 and a slot boundary offset Bos2; the candidate transmission configuration 502(3) includes a frequency band Bw3 and a slot boundary offset Bos3; and the candidate transmission configuration 502(4) includes a frequency band Bw4 and a slot boundary offset Bos4. Each of the candidate transmission configurations 502(1)~502(4) includes a number of slots. For example, the candidate transmission configuration 502(1) includes slots Slt1(1)~Slt1(5); the candidate transmission configuration 502(2) includes slots Slt2(1)~Slt2(4); the candidate transmission configuration 502(3) includes slots Slt3(1)~Slt3(4); and the candidate transmission configuration 502(4) includes slots Slt4 (1)~Slt4 (4). The frequency bands Bw1, Bw2, Bw3, and Bw4 of the candidate transmission configurations 502(1)~502(4) are different, and the slot boundary offsets Bos1, Bos2, Bos3, and Bos4 of the candidate transmission configurations 502(1)~502(4) are also different.

In the example of FIG. 7, slots Slt1~Slt4 are mini-slots, each including 4 orthogonal frequency-division multiplexing (OFDM) symbols, for example. The first symbol is configured to transmit a control information, and the 3 subsequent symbols are configured to transmit a data signal. The boundary offsets Bos1~Bos4 are the time lengths of 0, 1, 2, and 3 OFDM symbols respectively. In the example of FIG. 7, although the boundary offset Bos1 is exemplified by the time length of 0 OFDM symbol, the slot boundary offset Bos1 does not have to be the time length of 0 OFDM symbol. In the example of FIG. 7, the boundary offsets Bos1~Bos4 respectively are the time lengths of integer multiples of OFDM symbols, but the present disclosure is not limited thereto. For example, the boundary offsets Bos1~Bos4 can be the time lengths of non-integer multiples of OFDM symbols. In the example of FIG. 7, the mini-slot is exemplified by 4 OFDM symbols, but the present disclosure is not limited thereto. The slot can be other low-latency slot, and can have a time length of other number of OFDM symbols. For example, the slot can have 14 OFDM symbols.

In step 704, it is assumed that the first packet is ready for transmission at time point t1, which corresponds to the second OFDM symbol of the slot Slt1(1) of the candidate transmission configuration 502(1). The communication system can select one of the candidate transmission configurations 502(1)~502(4) corresponding to the lowest latency as the first selected transmission configuration according to the ready-for-transmission time of the first packet t1. For example, the communication system selects one of the candidate transmission configurations 502(1)~502(4) whose start time of the slot is closest to the time point t1 (for example, the candidate transmission configuration 502(3) whose boundary offset Bos3 is 2 times of the OFDM symbol) as the first selected transmission configuration. The communication system further selects the first slot of the first selected transmission configuration (such as the slot Slt3(1) of the candidate transmission configuration 502(3)) as the first candidate slot.

In step 706, the first packet is transmitted to the receiver of the communication system by the transmitter of the communication system through the first candidate slot of the first selected transmission configuration (such as the slot Slt3(1) of the candidate transmission configuration 502(3)).

The frequency bands of the candidate transmission configuration described above can be the bandwidth parts (BWP) of a 5G system or the component carriers of an LTE system. To support the ultra-low-latency communication more efficiently, the embodiment of the present disclosure adopts carrier aggregation technology or standard 5G BWP technology, and allows each bandwidth part or each component carrier to have a different slot boundary offset. Thus, when data needs to be transmitted, a suitable bandwidth part or component carrier can be selected to reduce the waiting time.

In the above example, a slot is configured to transmit a packet. Assume it is detected that a new packet needs to be transmitted. If the packet is to be transmitted through the same candidate transmission configuration, the packet cannot be transmitted until the start time of the next slot of the same candidate transmission configuration is reached. According to the method according to an embodiment of the present disclosure, if the to-be-transmitted packet can be scheduled to the slot of other candidate transmission configuration having a smaller latency, the waiting time will be effectively reduced.

Latency can be reduced as the waiting time is reduced. When the SCS is 60 kHz, the time length of each OFDM symbol is 17.84 μs. Since each mini-slot includes 4 OFDM symbols in total, the mini-slot duration can be obtained from the equation: 17.84 μs*4=71.35 μs, and the waiting time is 1 OFDM symbol time, that is, 17.84 μs. Latency (that is, the waiting time plus the transmission time) can be obtained from the equation: 17.84 μs+71.35 μs=89.19 μs. The obtained value of 89.19 μs is less than 100 μs. Thus, the requirement of having a latency less than 100 μs can be met.

In the transmission method using only one candidate transmission configuration (such as the candidate transmission configuration 502(1)) to transmit data, this transmission method has a longer waiting time comparing to the method of the embodiments of the disclosure. For example, the communication system selects to perform data transmission at the start point (time point t3) of the slot Slt1(2) of candidate transmission configuration 502(1). As indicated in FIG. 7, the waiting time from time point t1 to time point t3 is the time length of 3 OFDM symbols, that is, 3*17.84 μs=53.52 μs. Latency (that is, the waiting time plus the transmission time) can be obtained from the equation: 3*17.84 μs+71.35 μs=124.87 μs. The value of 124.87 μs is larger than 100 μs, and therefore cannot meet the requirement of having a latency less than 100 μs. The above embodiments of the present disclosure adopt most of the 5G NR standards, not only meet the requirement of having an ultra-low-latency (less than 100 μs) but also effectively reduce multi-path fading. In the present embodiment, since the SCS can be a frequency of 60 kHz (or under 60 kHz) and the frequency of the SCS does not need to be too high, multi-path interference can be avoided. Since the SCS does not need to have a high frequency (for example, the frequency of the SCS used in an embodiment of the present disclosure does not need to be higher than 60 kHz), the hardware equipment using the transmitter or the receiver according to the embodiments of the present disclosure does not need to be adapted to a high frequency environment. Therefore, the circuit design can be simplified, and the complexity of the transmitter or the receiver can be reduced. Since the device complexity can be reduced and the effect of ultra-low latency can be maintained, the advantage of having low system complexity and high immediacy can be achieved. Such advantage makes the embodiments of the present disclosure particularly suitable to some applications, such as the MTC applications or the IoT technology.

The quantity of OFDM symbols in each slot of the above candidate transmission configurations is related to the wireless access time, and the less the quantity of OFDM symbols, the shorter the required wireless access time (that is, the waiting time plus the transmission time). The slot boundary offset of the candidate transmission configuration can be adjusted according to the numerology. That is, as the SCS varies, the corresponding slot boundary offset of the candidate transmission configuration varies accordingly.

Figure 8:
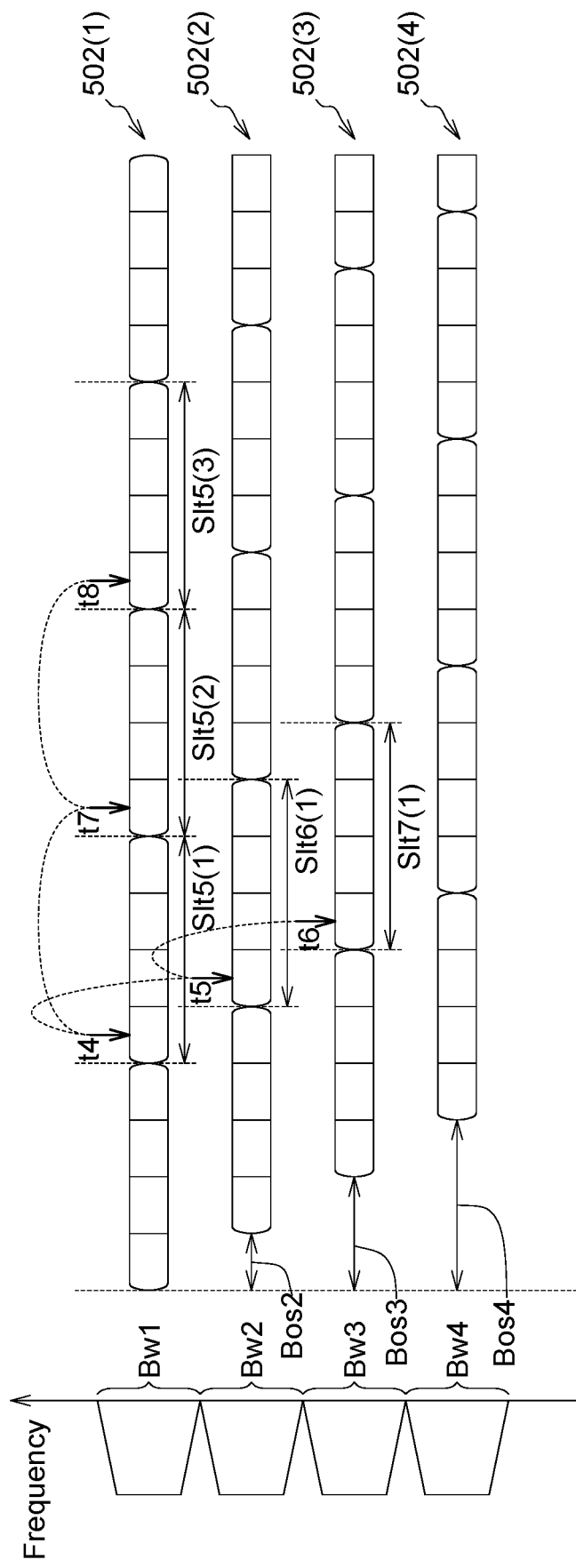
FIG. 8 is a schematic diagram of an example of receiving signals by a receiver using the wireless access method of FIG. 4.

Referring to FIG. 8, a schematic diagram of an example of receiving signals by a receiver using the wireless access method of FIG. 4 is shown. The wireless receiving method according to an embodiment of the present disclosure may further include the following steps. The first control information and the second control information are sequentially monitored by the receiver to determine whether the first control information and the second control information are for the receiver. If yes, the receiver performs data decoding to receive the corresponding control information. The first control information is transmitted through a first frequency band, and the second control information is transmitted through a second frequency band. The time difference between the transmission time points of the first control information and the second control information is less than a slot time, and the first frequency band is different from the second frequency band.

As indicated in FIG. 8, the receiver sequentially monitors candidate transmission configurations 502(1)~502(4) to determine whether the packets transmitted through the candidate transmission configurations 502(1)~502(4) is for the receiver. For example, the start symbols of the slots Slt5(1), Slt6 (1), Slt7 (1) of the candidate transmission configuration 502(1)~502(3) are sequentially monitored at time points t4, t5, and t6 respectively. The control information included in the start symbol of each packet records the destination of transmission. The receiver can read the control information included in the start symbol of each packet to determine whether the packets should be received by the receiver. If yes, the receiver receives the packet, and performs data decoding on other symbols of the packet, which are configured to transmit a data signal, to obtain a desired data. If the receiver determines that the packet should not be received by the receiver, the receiver does not process the packet but continues to monitor the candidate transmission configurations. For example, the receiver sequentially monitors the candidate transmission configurations 502(4), 502(1), 502 (2), and 502(3).

In the transmission method using only one candidate transmission configuration, the receiver does not receive the packet until the next slot of the same candidate transmission configuration is continuously monitored. For example, after monitoring the corresponding packet of the slot slt5(1) at time point t4, the receiver sequentially monitors corresponding packets of the slots slt5(2) and slt5(3) at time points t7 and t8. Thus, the receiver may receive the packets after an integer multiple of latency of the slot. When the transmission method according to an embodiment of the present disclosure is used, the receiver sequentially monitors the candidate transmission configurations 502(1)~502(4), for example, every one symbol time, and will receive the packet as long as the monitored packet is a packet that should be received by the receiver. In comparison to the method using only one candidate transmission configuration, the packet receiving method according to an embodiment of the present disclosure can quickly receive a packet with reduced waiting time.

Besides, the receiver can perform monitoring and demodulation over different candidate transmission configurations (for example, the receiver can alternately monitor different candidate transmission configurations and demodulate the required data), and does not need to simultaneously monitor a number of candidate transmission configurations or demodulate the data transmitted through a number of candidate transmission configurations. Thus, the embodiments of the present disclosure can be implemented without increasing the complexity in the hardware design of the receiver.

The transmitter is, for example, a base station, and the receiver is, for example, a user equipment. Or, the transmitter is a user equipment, and the receiver is a base station. That is, the wireless access method of the present disclosure can be adapted to a base station and a user equipment as well. When the base station performs data transmission, the base station is used as the transmitter of the wireless access method according to an embodiment of the present disclosure. When the base station performs data reception, the base station is used as a receiver of the wireless access method according to an embodiment of the present disclosure. The user equipment can be used similarly. When the user equipment performs data transmission, the user equipment is used as a transmitter of the wireless access method according to an embodiment of the present disclosure. When the user equipment performs data reception, the user equipment is used as a receiver of the wireless access method according to an embodiment of the present disclosure.

The user equipment can transmit packets using a grant-free transmission method or a grant-based transmission method. According to the grant-free transmission method, the user equipment can upload data to the base station without obtaining a permission from the base station. According to the grant-based transmission method, before uploading data to the base station, the user equipment must obtain a permission from the base station beforehand.

Figure 9:
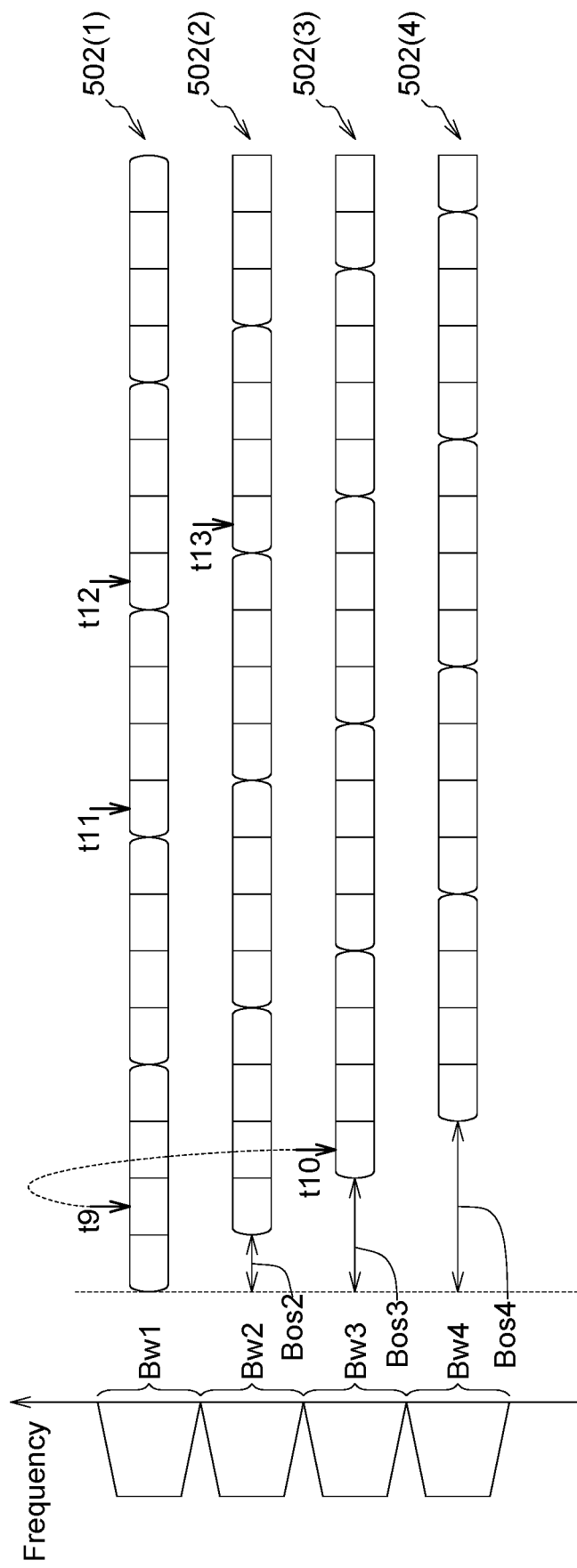
FIG. 9 is a schematic diagram of an example of transmitting packets by a user equipment using the wireless access method of FIG. 4 according to a grant-free transmission method or a grant-based transmission method.

Referring to FIG. 9, a schematic diagram of an example of transmitting packets by a user equipment using the wireless access method of FIG. 4 according to a grant-free transmission method or a grant-based transmission method is shown. Assume the grant-free transmission method is used. If the packet is ready for transmission at time point t9, the user equipment can select to transmit the packet at time point t10 through the candidate transmission configuration 502(3) corresponding to the lowest latency. Assume the grant-based transmission method. If the packet is ready for transmission at time point t11 and permission is received from the base station at time point t12, the user equipment can select to transmit the packet at time point t13 through the candidate transmission configuration 502(2) corresponding to the lowest latency.

Figure 10:
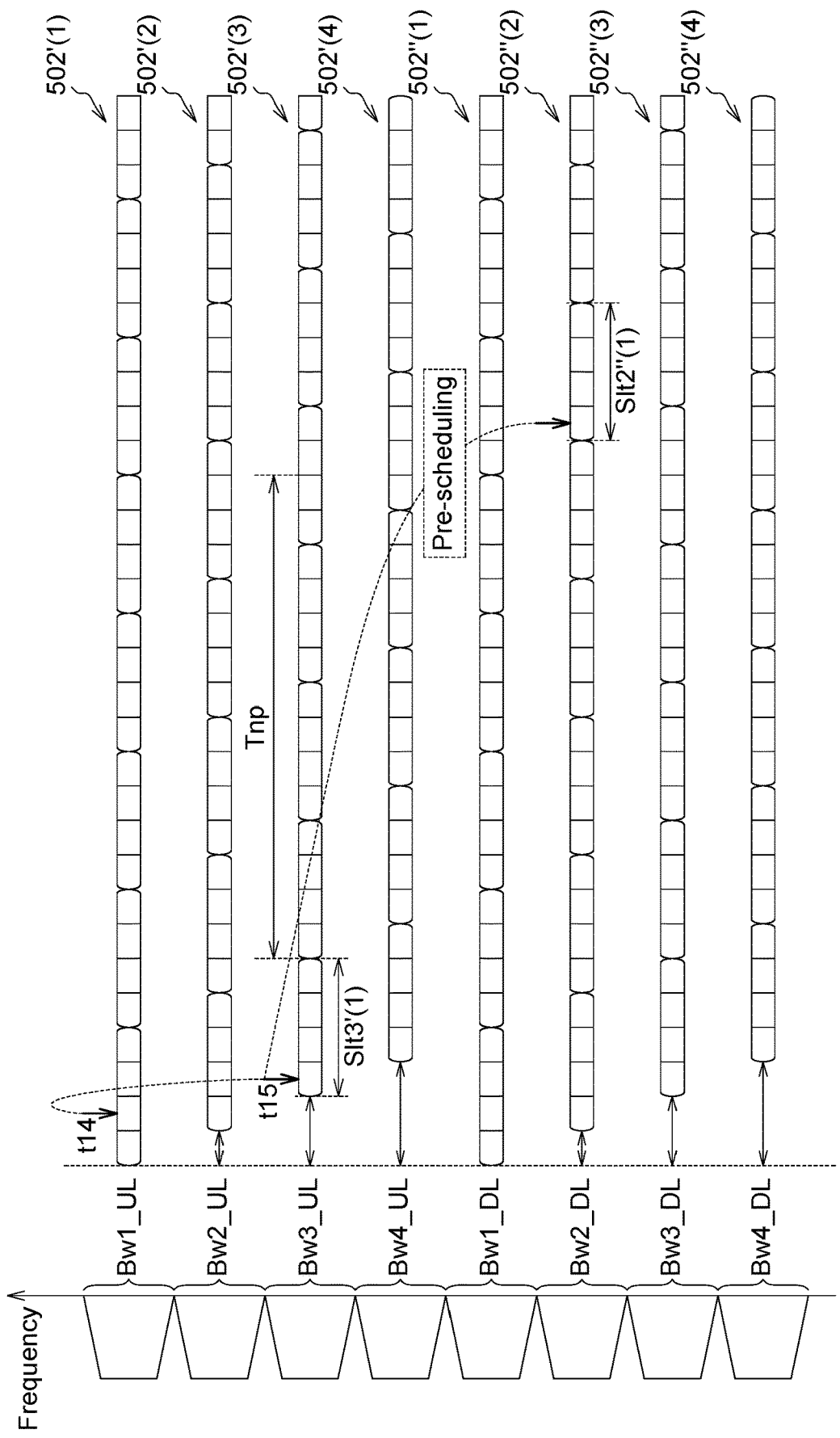
FIG. 10 is a schematic diagram of an example of transmitting packets using the pre-scheduling of the wireless access method of FIG. 4.

Referring to FIG. 10, a schematic diagram of an example of transmitting packets using the pre-scheduling of the wireless access method of FIG. 4 is shown. The wireless access method according to an embodiment of the present disclosure further includes the following steps. One of the candidate transmission configurations is pre-scheduled as a second selected transmission configuration by the transmitter according to the transmission time of a user uplink packet and the network processing time of a packet. A second packet is transmitted in response to the user uplink packet by the transmitter through the second selected transmission configuration.

As indicated in FIG. 10, the candidate transmission configurations according to an embodiment of the present disclosure may also include a number of downlink candidate transmission configurations and a number of uplink candidate transmission configurations, such as uplink candidate transmission configurations 502'(1)~502'(4) and downlink candidate transmission configurations 502"(1)~502"(4). The receiver selects one of the uplink candidate transmission configurations corresponding to the lowest latency, such as the uplink candidate transmission configuration 502'(3), according to the user uplink packet ready-for-transmission time at time point t14, for example. The receiver also selects the second slot Slt3'(1) of the candidate transmission configuration 502'(3). The receiver transmits the user uplink packet through the second slot Slt3'(1) of the candidate transmission configuration 502'(3). The transmitter (for example, the base station) pre-schedules one of the downlink candidate transmission configurations (for example, candidate transmission configuration 502"(2)) as the second selected transmission configuration according to the transmission time of the user uplink packet (for example, time point t15) and the network processing time of the packet (for example, network processing time Tnp), and selects the slot of the second selected transmission configuration (for example, the slot Slt2"(1) of the candidate transmission configuration 502"(2)). The transmitter transmits the second packet through the slot of the second selected transmission configuration (for example, the slot Slt2"(1) of the candidate transmission configuration 502"(2)) in response to the user uplink packet. The uplink candidate transmission configurations 502'(1)~502'(4) are located in frequency bands Bw1_UL~Bw4_UL, and the downlink candidate transmission configurations 502"(1)~502"(4) are located in frequency bands Bw1_DL~Bw4_DL.

The present disclosure further provides a wireless transmission method for a communication system. The wireless transmission method includes the following steps. A number of candidate transmission configurations, each including a frequency band, a slot boundary offset, and a number of slots, are provided, wherein the frequency bands of the candidate transmission configurations are different, and the slot boundary offsets of the candidate transmission configurations are also different. One of the candidate transmission configurations corresponding to the lowest latency is selected as a first selected transmission configuration according to the ready-for-transmission time of a first packet. The first packet is transmitted through the first selected transmission configuration.

The present disclosure further provides a wireless receiving method for a communication system. The wireless receiving method includes the following steps. A number of candidate transmission configurations, each including a frequency band, a slot boundary offset, and a number of slots, are provided, wherein the frequency bands of the candidate transmission configurations are different, and the slot boundary offsets of the candidate transmission configurations are also different. A first packet is transmitted through one of the candidate transmission configurations corresponding to the lowest latency selected according to the ready-for-transmission time of the first packet. The candidate transmission configurations are sequentially monitored by a receiver to determine whether the packets transmitted through the candidate transmission configurations is for the receiver. If yes, the receiver performs data decoding to receive the first packet. If no, the receiver continues to monitor the candidate transmission configurations.

Figure 11:
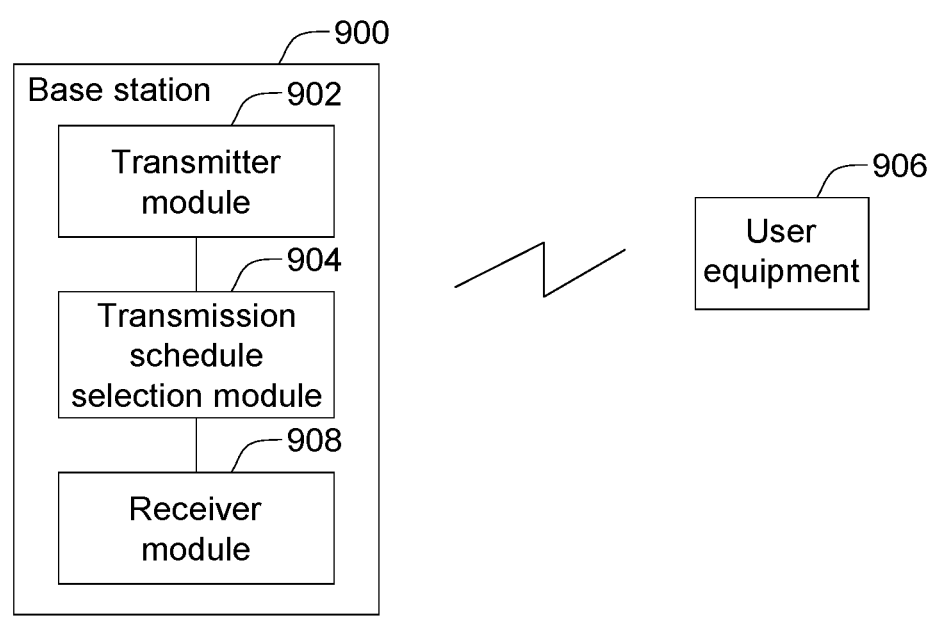
FIG. 11 is an example of a block diagram of a base station using the wireless access method of FIG. 4 according to an embodiment of the present disclosure.

Referring to FIG. 11, an example of a block diagram of a base station using the wireless access method of FIG. 4 according to an embodiment of the present disclosure is shown. The base station 900 includes a transmitter module 902 and a transmission schedule selection module 904. The transmitter module 902 is electrically connected to the transmission schedule selection module 904, and under the control of the transmission schedule selection module 904, transmits a first control information and a second control information through a first frequency band and a second frequency band respectively. The time difference between the transmission time points of the first control information and the second control information is less than a slot time, and the first frequency band is different from the second frequency band.

The transmitter module 902 is further configured to generate a packet according to the above embodiments and select a slot to transit the packet. The transmission schedule selection module 904 is further configured to obtain the first packet including the first control information and the second packet including the second control information according to the above embodiments.

Furthermore, the transmitter module 902 is configured to provide a number of candidate transmission configurations each including a frequency band, a slot boundary offset, and a number of slots. The frequency bands of the candidate transmission configurations are different, the slot boundary offsets of the candidate transmission configurations are also different, and the slot boundary offset of each candidate transmission configuration is less than the slot time. The transmission schedule selection module 902 is further configured to select one of the candidate transmission configurations corresponding to the lowest latency as the first selected transmission configuration according to the ready-for-transmission time of the first packet, wherein the frequency band of the first selected transmission configuration is the first frequency band, and the first packet includes the first control information. The transmitter module 904 is further configured to transmit the first packet to a receiver, such as the user equipment 906, through the first selected transmission configuration.

The user equipment 906 is configured to monitor the candidate transmission configurations to determine whether the packets transmitted through the candidate transmission configurations is for the user equipment. If yes, the user equipment performs data decoding to receive the first packet. If no, the user equipment continues to monitor the candidate transmission configurations. The base station 900 further includes a receiver module 908 configured to monitor the candidate transmission configurations to determine whether the packets transmitted through the candidate transmission configurations is for the base station. If yes, the receiver module 908 performs data decoding to receive the packet. If no, the receiver module 908 continues to monitor the candidate transmission configurations. The transmission schedule selection module 904 pre-schedules one of the candidate transmission configurations as a second selected transmission configuration according to the transmission time of a user uplink packet and the network processing time of a packet. The transmitter module 902 further transmits the second packet in response to the user uplink packet through the second selected transmission configuration.

The wireless receiving method and the wireless access method for a communication system, and the base station applying disclosed in the present disclosure provide a low-latency mechanism for accessing radio frame. The low-latency mechanism enables the communication system having a carrier frequency under 6 GHz to have low latency and to have a robust capacity against multi-path fading. Furthermore, the user equipment does not need to process the data having a wide frequency band. The wireless receiving method and the wireless access method for a communication system, and the base station applying the same of the present disclosure can be adapted to the 5G URLLC (ultra-reliable low-latency communication) standard.

Moreover, when the carrier aggregation technology or the bandwidth part technology of the present disclosure is combined with the slot boundary offset technology, the communication system having a carrier frequency under 6 GHz can also possess the feature of low latency. The above embodiments of the present disclosure adopt most of the 5G NR standards, not only meet the requirement of having an ultra-low-latency and effectively reduce multi-path fading, but also maintain the complexity and immediacy of the MTC applications or the IoT technology.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A wireless access method for a communication system, comprising:
  transmitting a first control information by a transmitter through a first frequency band; and
  transmitting a second control information by the transmitter through a second frequency band,
  wherein time difference between transmission time points of the first control information and the second control information is less than a slot time, and the first frequency band is different from the second frequency band.

2. The wireless access method according to claim 1, wherein the step of transmitting the first control information through the first frequency band comprises:
  generating a first packet; and
  selecting an unoccupied first frequency band slot whose start time is closer to transmit the first packet through the unoccupied first frequency band slot according to the start time of the unoccupied first frequency band slot of the first frequency band and the start time of an unoccupied second frequency band slot of the second frequency band,
  wherein the first packet comprises the first control information.

3. The wireless access method according to claim 2, wherein the step of transmitting the second control information through the second frequency band comprises:
  generating a second packet; and
  selecting an unoccupied second frequency band slot whose start time is closer to transmit the second packet through the unoccupied second frequency band slot according to the start time of another unoccupied first frequency band slot of the first frequency band and the start time of the unoccupied second frequency band slot of the second frequency band,
  wherein the second packet comprises the second control information.

4. The wireless access method according to claim 1, wherein the step of transmitting the first control information through the first frequency band comprises:
  generating a first packet; and
  selecting an unoccupied first frequency band slot whose start time is closer to transmit the first packet through the unoccupied first frequency band slot according to the start time of the unoccupied first frequency band slot of the first frequency band, the start time of an unoccupied second frequency band slot of the second frequency band, and the start time of an unoccupied third frequency band slot of a third frequency band,
  wherein time difference between the start time of the third frequency band slot and the start time of the first frequency band slot is less than the slot time, and time difference between the start time of the third frequency band slot and the start time of the second frequency band slot is also less than the slot time,
  wherein the first packet comprises the first control information, and the third frequency band is different from the first frequency band and the second frequency band.

5. The wireless access method according to claim 4, wherein the step transmitting the second control information through the second frequency band comprises:
  generating a second packet; and
  selecting the unoccupied second frequency band slot whose start time is closer to transmit the second packet through the unoccupied second frequency band slot according to the start time of another unoccupied first frequency band slot of the first frequency band, the start time of the unoccupied second frequency band slot of the second frequency band, and the start time of the unoccupied third frequency band slot of the third frequency band,
  wherein the second packet comprises the second control information.

6. The wireless access method according to claim 1, further comprising obtaining a first packet comprising the first control information and a second packet comprising the second control information, wherein a priority of the first packet is higher than a priority of the second packet, and the step of transmitting the first control information through the first frequency band comprises:
  selecting an unoccupied first frequency band slot whose start time is closer to transmit the first packet through the unoccupied first frequency band slot according to the start time of the unoccupied first frequency band slot of the first frequency band and the start time of an unoccupied second frequency band slot of the second frequency band,
  wherein the step of transmitting the second control information through the second frequency band comprises:
  selecting the unoccupied second frequency band slot whose start time is closer to transmit the second packet through the unoccupied second frequency band slot according to the start time of another unoccupied first frequency band slot of the first frequency band and the start time of the unoccupied second frequency band slot of the second frequency band.

7. The wireless access method according to claim 1, further comprising:
  sequentially monitoring the first control information and the second control information by a receiver to determine whether packets transmitted through the first frequency band and the second frequency band is for the receiver, if yes, performing data decoding by the receiver to receive a corresponding packet.

8. The wireless access method according to claim 1, the first frequency band and the second frequency band are a plurality of bandwidth parts (BWP) or a plurality of component carriers.

9. The wireless access method according to claim 1, wherein quantity of orthogonal frequency-division multiplexing (OFDM) symbols in corresponding slots of the first control information and the second control information is related to a wireless access time, the slots are mini-slots or other low-latency slots, and the time difference between the transmission time points of the first control information and the second control information can be adjusted according to a numerology.

10. The wireless access method according to claim 1, further comprising:
  providing a plurality of candidate transmission configurations, each comprising a frequency band, a slot boundary offsets, and a plurality of slots, wherein the frequency bands of the candidate transmission configurations are different, the slot boundary offsets of the candidate transmission configurations are different, and the slot boundary offset of each candidate transmission configuration is less than the slot time;

selecting one of the candidate transmission configurations corresponding to the lowest latency as a first selected transmission configuration according to a ready-for-transmission time of a first packet, wherein the frequency band of the first selected transmission configuration is the first frequency band, and the first packet comprises the first control information; and transmitting the first packet to a receiver by the transmitter through the first selected transmission configuration.

11. The wireless access method according to claim 10, further comprising:

pre-scheduling one of the candidate transmission configurations as a second selected transmission configuration by the transmitter according to a transmission time of a user uplink packet and a network processing time of a packet; and transmitting a second packet in response to the user uplink packet by the transmitter through the second selected transmission configuration.

12. The wireless access method according to claim 1, wherein the transmitter is a base station or a user equipment.

13. A wireless receiving method for a communication system, comprising:

sequentially monitoring a first control information and a second control information by a receiver to determine whether the first control information and the second control information are for the receiver, if yes, performing data decoding by the receiver to receive a corresponding control information, wherein the first control information is transmitted through a first frequency band, and the second control information is transmitted through a second frequency band, wherein time difference between transmission time points of the first control information and the second control information is less than a slot time, and the first frequency band is different from the second frequency band.

14. The wireless receiving method according to claim 13, wherein an unoccupied first frequency band slot whose start time is closer is selected for transmitting a first packet through the unoccupied first frequency band slot according to the start time of the unoccupied first frequency band slot of the first frequency band and the start time of an unoccupied second frequency band slot of the second frequency band, wherein the first packet comprises the first control information.

15. The wireless receiving method according to claim 14, wherein the unoccupied second frequency band slot whose start time is closer is selected for transmitting a second packet through the unoccupied second frequency band slot according to the start time of another unoccupied first frequency band slot of the first frequency band and the start time of the unoccupied second frequency band slot of the second frequency band, wherein the second packet comprises the second control information.

16. The wireless receiving method according to claim 13, wherein an unoccupied first frequency band slot whose start time is closer is selected for transmitting a first packet through the unoccupied first frequency band slot according to the start time of the unoccupied first frequency band slot of the first frequency band, the start time of an unoccupied second frequency band slot of the second frequency band, and the start time of an unoccupied third frequency band slot of a third frequency band, wherein time difference between the start time of the third frequency band slot and the start time of the first frequency band slot is less than the slot time, and time difference between the start time of the third frequency band slot and the start time of the second frequency band slot is less than the slot time, wherein the first packet comprises the first control information, and the third frequency band is different from the first frequency band and the second frequency band.

17. The wireless receiving method according to claim 16, wherein the unoccupied second frequency band slot whose start time is closer is selected for transmitting a second packet through the unoccupied second frequency band slot according to the start time of another unoccupied first frequency band slot of the first frequency band, the start time of the unoccupied second frequency band slot of the second frequency band, and the start time of the unoccupied third frequency band slot of the third frequency band, wherein the second packet comprises the second control information.

18. The wireless receiving method according to claim 13, wherein a first packet comprising the first control information and a second packet comprising the second control information are obtained, a priority of the first packet is higher than a priority of the second packet, and an unoccupied first frequency band slot whose start time is closer is selected for transmitting the first packet through the unoccupied first frequency band slot according to the start time of the unoccupied first frequency band slot of the first frequency band and the start time of an unoccupied second frequency band slot of the second frequency band, wherein the unoccupied second frequency band slot whose start time is closer is selected for transmitting the second packet through the unoccupied second frequency band slot according to the start time of another unoccupied first frequency band slot of the first frequency band and the start time of the unoccupied second frequency band slot of the second frequency band.

19. The wireless receiving method according to claim 13, the first frequency band and the second frequency band are a plurality of bandwidth parts or a plurality of component carriers.

20. The wireless receiving method according to claim 13, wherein quantity of orthogonal frequency-division multiplexing (OFDM) symbols in corresponding slots of the first control information and the second control information is related to wireless access time, the slots are mini-slots or other low-latency slots, and the time difference between the transmission time points of the first control information and the second control information can be adjusted according to a numerology.

21. The wireless receiving method according to claim 13, further comprising:

providing a plurality of candidate transmission configuration, each comprising a frequency band, a slot boundary offsets, and a plurality of slots, wherein the frequency bands of the candidate transmission configurations are different, the slot boundary offsets of the candidate transmission configurations are different, and the slot boundary offset of each candidate transmission configuration is less than the slot time; and receiving a first packet transmitted through a first selected transmission configuration, wherein the first selected transmission configuration is one of the candidate transmission configurations corresponding to the lowest latency selected according to a ready-for-transmission time of the first packet, wherein the frequency band of the first selected transmission configuration is the first frequency band, and the first packet comprises the first control information.

22. The wireless receiving method according to claim 21, further comprising:
pre-scheduling one of the candidate transmission configurations as a second selected transmission configuration by a transmitter according to a transmission time of a user uplink packet and a network processing time of a packet; and
transmitting a second packet in response to the user uplink packet by the transmitter through the second selected transmission configuration.

23. The wireless receiving method according to claim 13, wherein the transmitter is a base station or a user equipment.

24. A base station, comprising:
a transmission schedule selection module; and
a transmitter module electrically connected to the transmission schedule selection module, wherein the transmitter module, under control of the transmission schedule selection module, transmits a first control information through a first frequency band, and transmits a second control information through a second frequency band,
wherein time difference between transmission time points of the first control information and the second control information is less than a slot time, and the first frequency band is different from the second frequency band.

25. The base station according to claim 24, wherein the transmitter module is further configured to generate a first packet and select an unoccupied first frequency band slot whose start time is closer to transmit the first packet through the unoccupied first frequency band slot according to the start time of the unoccupied first frequency band slot of the first frequency band and the start time of an unoccupied second frequency band slot of the second frequency band,
wherein the first packet comprises the first control information.

26. The base station according to claim 25, wherein the transmitter module is further configured to generate a second packet and select the unoccupied second frequency band slot whose start time is closer to transmit the unoccupied second packet through the second frequency band slot according to the start time of another unoccupied first frequency band slot of the first frequency band and the start time of the unoccupied second frequency band slot of the second frequency band,
wherein the second packet comprises the second control information.

27. The base station according to claim 24, wherein the transmitter module is further configured to generate a first packet and select an unoccupied first frequency band slot whose start time is closer to transmit the first packet through the unoccupied first frequency band slot according to the start time of the unoccupied first frequency band slot of the first frequency band, the start time of an unoccupied second frequency band slot of the second frequency band, and the start time of an unoccupied third frequency band slot of a third frequency band,
wherein time difference between the start time of the third frequency band slot and the start time of the first frequency band slot is less than the slot time, and time difference between the start time of the third frequency band slot and the start time of the second frequency band slot is less than the slot time,
wherein the first packet comprises the first control information, and the third frequency band is different from the first frequency band and the second frequency band.

28. The base station according to claim 27, wherein the transmitter module is further configured to generate a second packet and select the unoccupied second frequency band slot whose start time is closer to transmit the second packet through the unoccupied second frequency band slot according to the start time of another unoccupied first frequency band slot of the first frequency band, the start time of the unoccupied second frequency band slot of the second frequency band, and the start time of the unoccupied third frequency band slot of the third frequency band,
wherein the second packet comprises the second control information.

29. The base station according to claim 24, wherein the transmission schedule selection module is further configured to obtain a first packet comprising the first control information and a second packet comprising the second control information, and a priority of the first packet is higher than a priority of the second packet, and the transmitter module is further configured to select an unoccupied first frequency band slot whose start time is closer to transmit the first packet through the unoccupied first frequency band slot according to the start time of the unoccupied first frequency band slot of the first frequency band and the start time of an unoccupied second frequency band slot of the second frequency band,
wherein the transmitter module is further configured to select the unoccupied second frequency band slot whose start time is closer to transmit the second packet through the unoccupied second frequency band slot according to the start time of another unoccupied first frequency band slot of the first frequency band and the start time of the unoccupied second frequency band slot of the second frequency band.

30. The base station according to claim 24, wherein the first frequency band and the second frequency band are a plurality of bandwidth parts or a plurality of component carriers.

31. The base station according to claim 24, wherein quantity of OFDM symbols in corresponding slots of the first control information and the second control information is related to wireless access time, the slots are mini-slots or other low-latency slots, and the time difference between the transmission time points of the first control information and the second control information can be adjusted according to a numerology.

32. The base station according to claim 24, wherein the transmitter module is further configured to provide a plurality of candidate transmission configurations, each comprising a frequency band, a slot boundary offsets, and a plurality of slots, the frequency bands of the candidate transmission configurations are different, the slot boundary offsets of the candidate transmission configurations are different, and the slot boundary offset of each candidate transmission configuration is less than the slot time,
wherein the transmission schedule selection module is further configured to select one of the candidate transmission configurations corresponding to the lowest latency as a first selected transmission configuration according to a ready-for-transmission time of a first packet, and the frequency band of the first selected transmission configuration is the first frequency band, and the first packet comprises the first control information, and the transmitter module is further configured to transmit the first packet to a receiver through the first selected transmission configuration.

33. The base station according to claim 32, wherein the transmission schedule selection module is further configured to pre-schedule one of the candidate transmission configurations as a second selected transmission configuration according to a transmission time of a user uplink packet and a network processing time of a packet, and the transmitter module is further configured to transmit a second packet in response to the user uplink packet through the second selected transmission configuration.

34. The base station according to claim 24, wherein the transmitter is the base station or a user equipment.

* * * * *